US007089290B2

(12) United States Patent
Hennessey et al.

(10) Patent No.: US 7,089,290 B2
(45) Date of Patent: Aug. 8, 2006

(54) DYNAMICALLY CONFIGURING NETWORK COMMUNICATION PARAMETERS FOR AN APPLICATION

(75) Inventors: Wade L Hennessey, Palo Alto, CA (US); John B. Wainwright, Los Gatos, CA (US)

(73) Assignee: Kontiki, Inc., Sunnyvale, CA (US)

(*) Notice: Subject to any disclaimer, the term of this patent is extended or adjusted under 35 U.S.C. 154(b) by 693 days.

(21) Appl. No.: 10/211,601

(22) Filed: Aug. 2, 2002

(65) Prior Publication Data

US 2003/0028626 A1 Feb. 6, 2003

Related U.S. Application Data

(60) Provisional application No. 60/310,306, filed on Aug. 4, 2001.

(51) Int. Cl.
*G06F 15/167* (2006.01)

(52) U.S. Cl. .................. 709/213; 709/218; 709/223; 709/234

(58) Field of Classification Search ............... 707/213; 709/214, 218–219, 223–226, 232–234, 213
See application file for complete search history.

(56) References Cited

U.S. PATENT DOCUMENTS

| 5,884,031 | A | | 3/1999 | Ice ............................. 395/200 |
|---|---|---|---|---|
| 5,948,070 | A | * | 9/1999 | Fujita ......................... 709/243 |
| 6,122,664 | A | * | 9/2000 | Boukobza et al. .......... 709/224 |
| 6,453,346 | B1 | * | 9/2002 | Garg et al. ................. 709/224 |
| 6,633,901 | B1 | * | 10/2003 | Zuili ........................... 709/203 |
| 6,700,590 | B1 | * | 3/2004 | DeMesa et al. ............ 715/744 |
| 6,714,976 | B1 | * | 3/2004 | Wilson et al. ............... 709/224 |
| 6,742,048 | B1 | * | 5/2004 | Walsh ......................... 709/248 |
| 6,772,207 | B1 | * | 8/2004 | Dorn et al. ................. 709/224 |
| 6,789,117 | B1 | * | 9/2004 | Joiner et al. ............... 709/224 |
| 6,901,604 | B1 | * | 5/2005 | Kiraly ......................... 725/93 |

FOREIGN PATENT DOCUMENTS

| WO | WO 99/27686 | 6/1999 |
|---|---|---|
| WO | WO 01/54357 | 7/2001 |

OTHER PUBLICATIONS

Publication entitled "Fixed Versus Variable Packet Sizes in Fast Packet-Switched Networks", by Mahmoud Naghshineh et al., IBM Thomas J. Watson Research Center, IEEE, 1993, pp. 217-226.

Publication entitled "WWW-Based Internet Resource Management System", by Hong Liu et al., IEEE, 1998, pp. 11-20.

Publication entitled "User Service Assistant: An Ent-to-End Reactive QoS Architecture", by Bjorn Landfeldt et al., IEEE, 1998, pp. 177-186.

* cited by examiner

*Primary Examiner*—Zarni Maung
*Assistant Examiner*—Van Nguyen
(74) *Attorney, Agent, or Firm*—Park, Vaughan & Fleming LLP

(57) ABSTRACT

One embodiment of the present invention provides a system that facilitates dynamically configuring communication parameters for an application on a network node. During operation, the system monitors activities on the network node that are external to the application. If the level of the activities exceeds a specified threshold, the system adjusts the communications parameters for the application, so that activities external to the application on the network node are not adversely affected by communication activities of the application.

20 Claims, 7 Drawing Sheets

DYNAMICALLY CONFIGURING NETWORK COMMUNICATION PARAMETERS FOR AN APPLICATION

RELATED APPLICATION

This application hereby claims priority under 35 U.S.C. §119 to U.S. Provisional Patent Application No. 60/310,306, filed on Aug. 4, 2001, entitled "Method and Apparatus for Enabling the Rich Media Revolution," by inventors Wade L. Hennessey, John B. Wainwright, Anthony A. Espinoza, Christopher G. Saito and Michael J. Homer.

BACKGROUND

1. Field of the Invention

The present invention relates to systems that communicate across computer networks. More specifically, the present invention relates to a method and apparatus for dynamically configuring network communications parameters for an application.

2. Related Art

The explosion of broadband communications has helped the Internet become a viable distribution mechanism for multimedia and high quality video. Prior to broadband, conventional modems were much too slow for the large file sizes that video demands. Now that more and more people have broadband connections and are requesting ever larger items of content, bandwidth and server utilization is quickly becoming a bottleneck on the distribution end. For example, in some cases, extraordinary events have brought online news sites to a virtual standstill as people flocked to them to retrieve video of the events.

Some companies have tried to solve this problem by creating distributed content delivery networks. In a distributed content delivery network, once a client has received a file, that client becomes a potential server for that file to other clients. This is a great advantage because as clients download the content, the number of potential servers for the content grows. In this way, the classic bottleneck caused by many clients trying to retrieve the same content from a single server is virtually eliminated.

However, distributed content delivery networks suffer from a number of problems. While distributed content delivery networks have alleviated bandwidth bottlenecks at server locations, they have created bandwidth congestion at many client sites. Moreover, a large percentage of current broadband connections provide asymmetrical bandwidth. For example, a typical DSL or Cable Modem connection offers data transfer at the rate of 384 Kbps to 1.5 Mbps downstream, but only 128 Kbps upstream. Hence, it is not uncommon for the entire upstream bandwidth to be consumed by serving one piece of content to one peer.

Asymmetrical bandwidth can cause wasted bandwidth and decreased performance in many situations. For example, suppose a peer is receiving content at 512 Kbps from a server, and during this download, the peer receives a request to send the content to a remote peer. In response to the request, the peer starts sending the content to the remote peer. This outgoing content consumes almost the entire outgoing bandwidth, which causes a delay in sending the packet acknowledgements for the incoming packets of content that the peer is receiving from the server. Because the server that is sending the content to the peer does not receive packet acknowledgements in a timely manner, it reduces the rate at which it sends out the content to the peer. Consequently, in this situation, the saturation of the outgoing bandwidth actually degrades the performance of the incoming bandwidth.

In some cases, the distributed content delivery network application interferes with tasks that the user of the machine is trying to accomplish. For example, while the distributed content delivery network application is busy sending and receiving content, the user might be forced to wait an extra long period of time to load a web page or download email. Note that processor and memory resources are also used by distributed content delivery networks. Hence, queries can take an extra long time to execute.

What is needed is a method and an apparatus for distributed content delivery without the problems described above.

SUMMARY

One embodiment of the present invention provides a system that facilitates dynamically configuring communication parameters for an application on a network node. During operation, the system monitors activities on the network node that are external to the application. If the level of the activities exceeds a specified threshold, the system adjusts the communications parameters for the application, so that activities external to the application on the network node are not adversely affected by communication activities of the application.

In a variation on this embodiment, adjusting the communications parameters for the application involves temporarily ceasing all communications activity for the application.

In a variation on this embodiment, adjusting the communications parameters for the application involves adjusting the communications parameters for each connection between the application and remote applications on remote network nodes independently. This independent throttling can be based on the characteristics of the remote nodes or characteristics of the data being communicated.

In a variation on this embodiment, the system receives a server hint from a remote application located on a remote node, wherein the remote application receives outbound communications from the application. In response to the server hint, the system adjusts the outbound communications parameters for the application, thereby allowing the remote application to control inbound communications from the application.

In a variation on this embodiment, the system generates server hints and sends the server hints to remote applications on remote network nodes. These server hints are messages that inform the remote applications to adjust the communications parameters for communications sent to the application.

In a variation on this embodiment, the system adjusts the communications parameters for the application by adjusting the time the application waits between sending packets.

In a variation on this embodiment, the system adjusts the communications parameters for the application by adjusting the packet size.

In a variation on this embodiment, the system adjusts the communications parameters for outbound communications independently from adjusting the communications parameters for inbound communications.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Distributed Computing System

Figure 1:
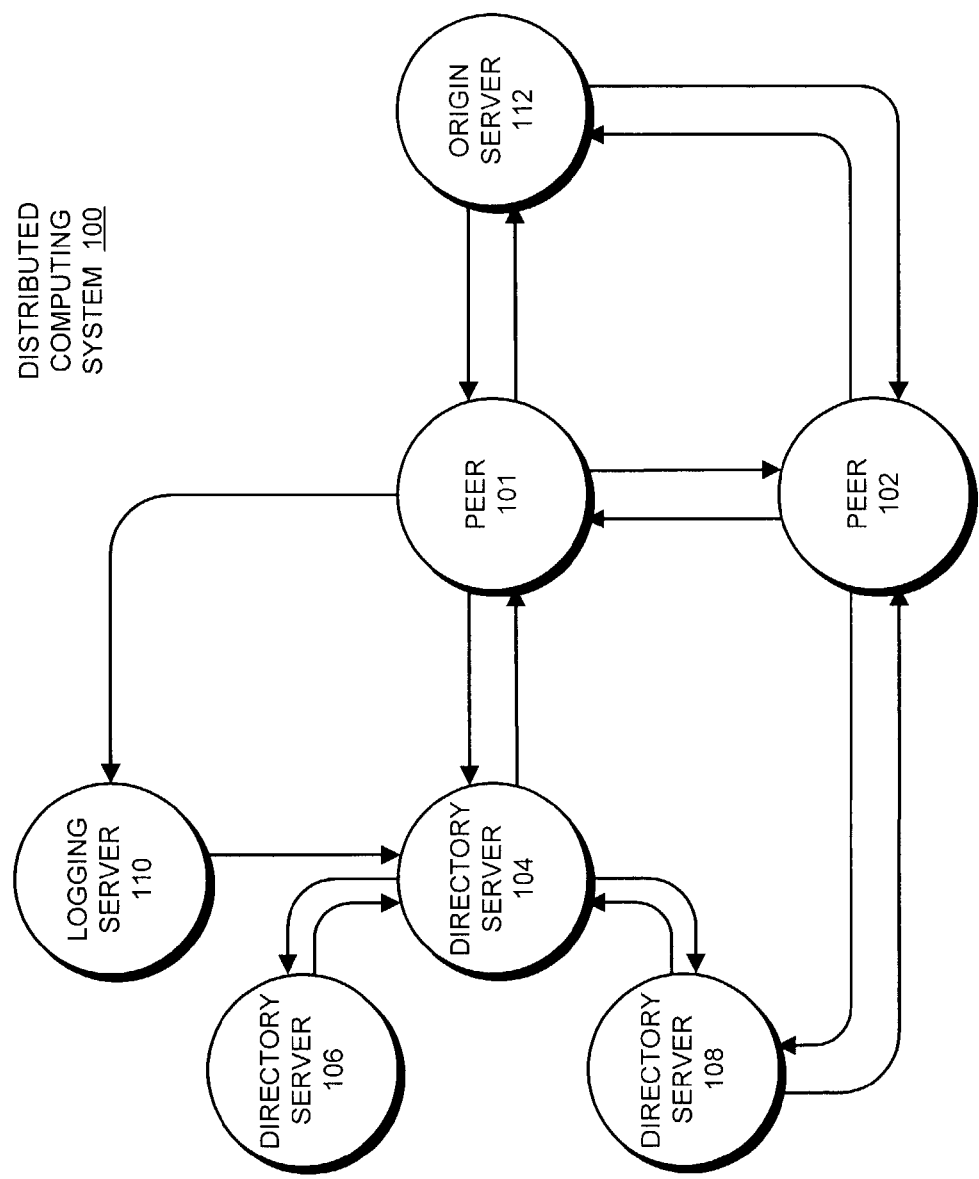
FIG. 1 illustrates a distributed computer system in accordance with an embodiment of the present invention.

FIG. 1 illustrates a distributed computing system 100 in accordance with an embodiment of the present invention. Distributed computing system 100 contains peer 101 and peer 102. Peers 101 and 102 can generally include any node on a network including computational capability and including a mechanism for communicating across the network. Note that peers 101 and 102 can act as clients and as candidate servers that can potentially serve content to other clients. FIG. 1 also contains directory servers 104, 106 and 108, logging server 110, and origin server 112. Servers 104, 106, 108, 110 and 112 can generally include any nodes on a computer network including a mechanism for servicing requests from a client for computational and/or data storage resources.

In one embodiment of the present invention, peer 101 sends a request for content to directory server 104. Directory server 104 may additionally forward or redirect the request on to directory server 106 or directory server 108. Directory server 104 then sends a list of potential candidates back to peer 101. Note that any time a peer makes a request for content, then that peer becomes a potential candidate server for the content and may appear in the list of potential candidate servers that is forwarded to other clients. This list of candidates can optionally identify origin server 112 which contains the original source for the content. Peer 101 then uses this list to request content from peer 102. Peer 101 also sends feedback information back to logging server 110, such as the parts of the content that it has and the servers that it has tried to download from. Logging server 110 subsequently forwards the feedback information from peer 101 to directory server 104. Directory server 104 uses this information in response to future requests for the content.

Directory Server Architecture

Figure 2:
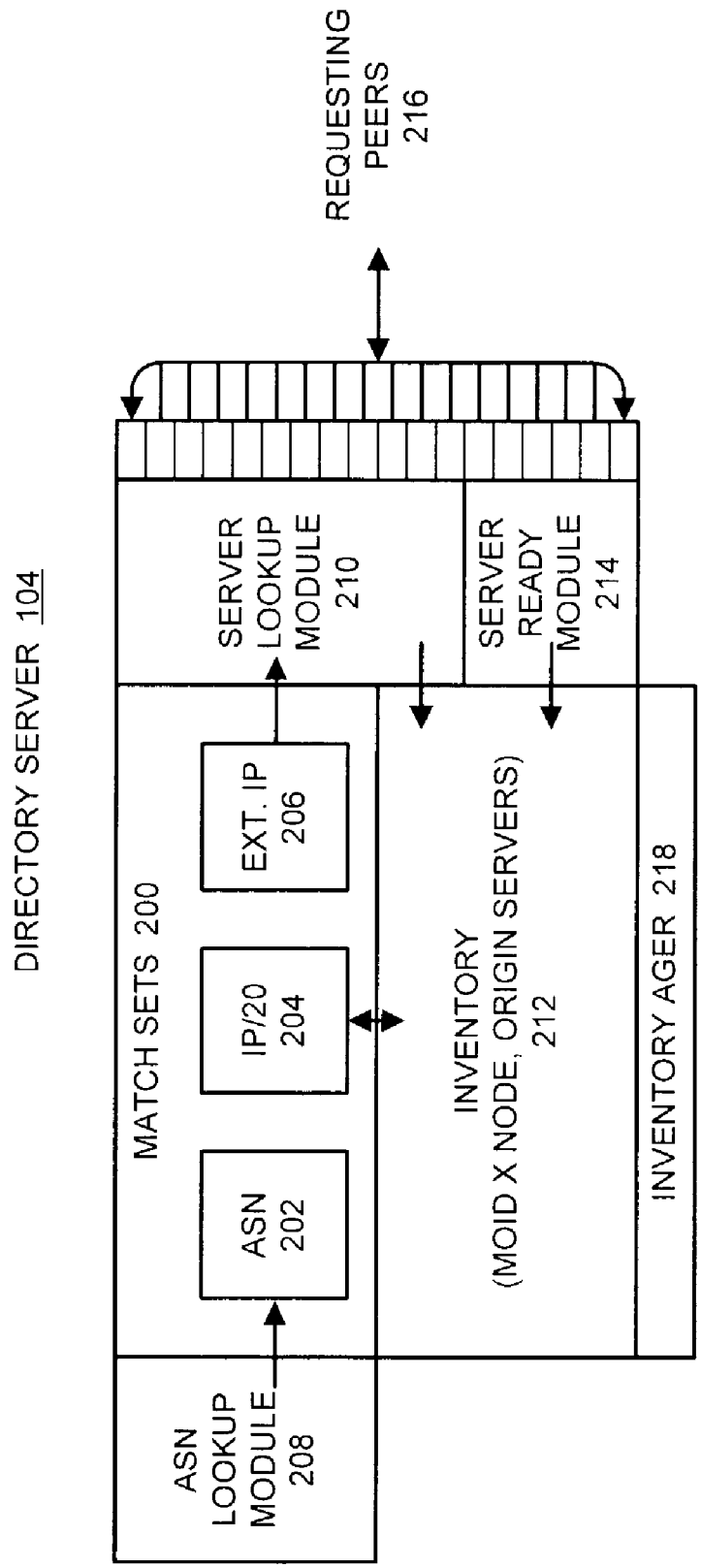
FIG. 2 illustrates the directory server architecture in accordance with an embodiment of the present invention.

FIG. 2 illustrates the architecture of directory server 104 in accordance with an embodiment of the present invention. Directory server 104 contains inventory 212. Inventory 212 includes a list of the potential candidates for items of content that have been published. When one of the requesting peers 216 submits a request to directory server 104 for content, ASN lookup module 208 determines the autonomous system number (ASN) of the autonomous system (AS) of which the peer is a member.

Directory server 104 maintains a set of prioritized lists of inventory 212 based on the items in match sets 200. These items include ASN 202, IP/20 network 204, and external IP address 206. Note that an IP/20 network is a collection of nodes that share a common IP address prefix consisting of 20 bytes. Moreover, an external IP address can include an IP address that has been assigned by a Network Address Translation (NAT) or similar device and can be different from the host's internal IP address. Server lookup module 210 determines the external IP address 206 of the peer and places the information in inventory 212. If a candidate server has an identical external IP address to that of the peer, then it is likely to be topologically close to the peer. Likewise, if it is a member of the same IP/20 network as the peer, then it is also likely relatively to be topologically close to the peer.

Server ready module 214 receives feedback information reported by requesting peers 216 (server ready reports) and updates inventory 212. Inventory ager 218 removes candidates from inventory 212 if directory server 104 has not heard from the candidate servers within a certain period of time.

Network with Firewalls

Figures 3, 4, 5:
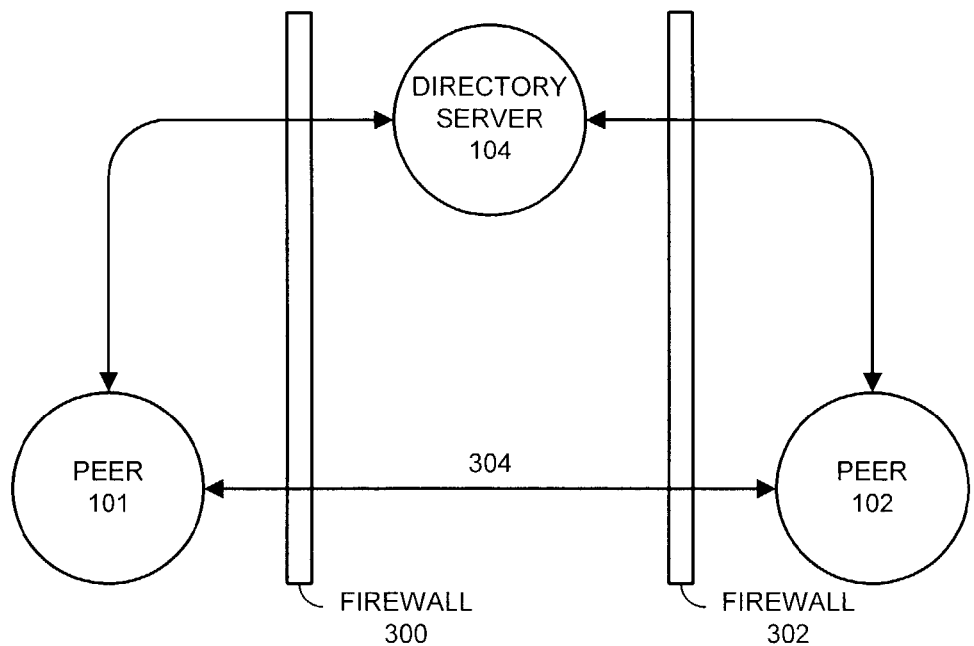
FIG. 3 illustrates a network with firewalls in accordance with an embodiment of the present invention.
FIG. 4 illustrates the attributes of a content request in accordance with an embodiment of the present invention.
FIG. 5 illustrates the directory server inventory in accordance with an embodiment of the present invention.

FIG. 3 illustrates a network with firewalls in accordance with an embodiment of the present invention. In FIG. 3, peer 101 is located behind firewall 300 and peer 102 is located behind firewall 302. Moreover, both peer 101 and peer 102 communicate with directory server 104 through their respective firewalls. During this communication, peer 101 requests content from directory server 104. Next, directory server 104 sends a list of candidate servers, including peer 102, to peer 101. Peer 101 then sends a request to peer 102 for the content via User Datagram protocol (UDP). Directory server 104 also sends a request to peer 102 to send the content to peer 101. Peer 102 sends a packet to peer 101 via UDP. (Note that in general other connectionless protocols can be used instead of UDP.) Since the request from peer 101 to peer 102 and the packet from peer 102 to peer 101 were sent via a connectionless protocol, they open ports in firewalls 300 and 302 that allows a connection 304 to be established between peer 101 and peer 102.

Attributes of a Content Request

FIG. 4 illustrates the attributes of a content request in accordance with an embodiment of the present invention. Incoming request 400 includes the following attributes: internal IP address 402; external IP address 404, and MOID 408. Note that MOID 408 is a unique identifier of the content that is assigned when the content is published. Internal IP address 402 is the IP address assigned at the node, and external IP address 404 is the IP address of a Network Address Translation (NAT) or similar device. Note that with the popularity of NAT devices, it is very common for peers in a NAT enabled LAN to have different internal IP addresses and an identical external IP address. It is also possible to analyze the content request to determine the ASN for the requestor's AS. ASN is the identifier of the Autonomous System (AS) for which a node belongs.

Directory Server Inventory

FIG. 5 illustrates the directory server inventory 212 from FIG. 2 in accordance with an embodiment of the present invention. Inventory 212 includes a list of all of the content and possible candidate servers of the content that are known by directory server 104. Inventory 212 also contains MOID 408 which identifies the content, node 502 which identifies a candidate server for the content, and range set 504 which identifies the pieces of the content that the candidate server has been reported as having in the past. In one embodiment of the present invention, node 502 is identified using standard PKI techniques.

Initial Content Request

Figure 6:
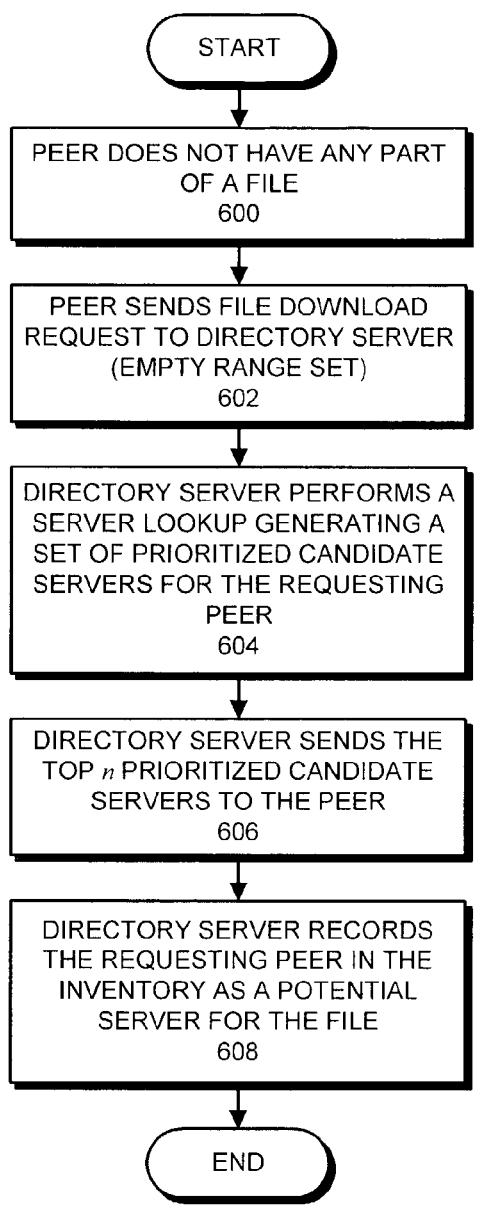
FIG. 6 illustrates processing of an initial content request in accordance with an embodiment of the present invention.

FIG. 6 illustrates processing of an initial content request in accordance with an embodiment of the present invention. The system starts when content is requested and peer 101 does not have any part of the content (step 600).

First, peer 101 sends a file download request to directory server 104 with an empty range set (step 602). Next, directory server 104 performs a server lookup from inventory 212 and generates a prioritized list of candidate servers for the content (step 604). Then, directory server 104 returns the top n candidate servers from the prioritized list to peer 101 (step 606). Finally, directory server 104 records peer 101 in inventory 212 as a possible future candidate server for the content (step 608).

Subsequent Content Request

Figure 7:
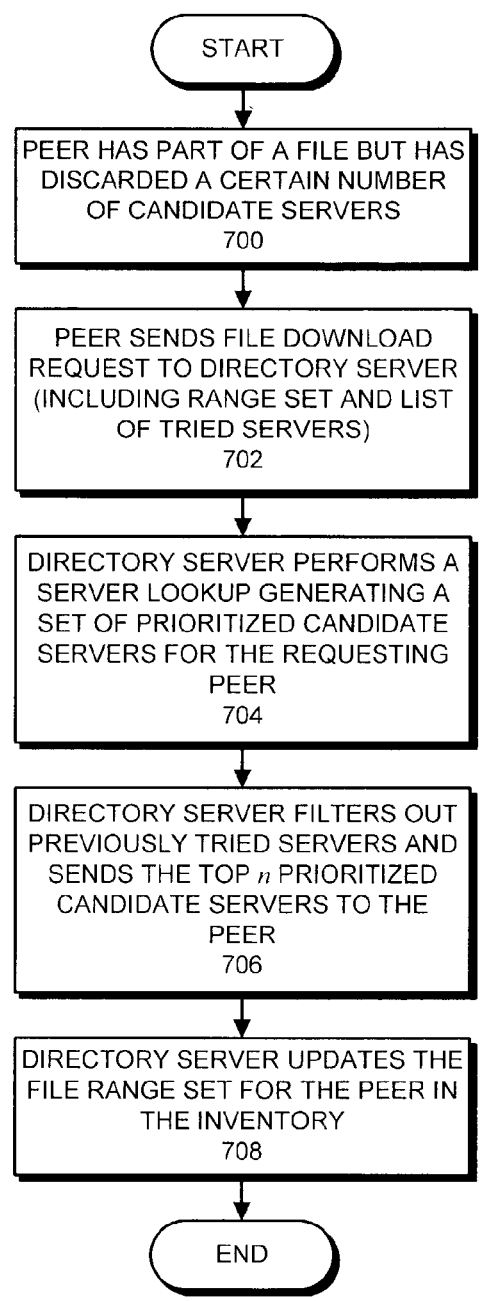
FIG. 7 illustrates processing of a subsequent content request in accordance with an embodiment of the present invention.

FIG. 7 illustrates processing of a subsequent content request in accordance with an embodiment of the present invention. The system starts when peer 101 has received part of a file, but has discarded a certain number of candidate servers for the file (step 700).

First, peer 101 sends a file download request to directory server 104 including an updated range set and a list of tried servers (step 702). Next, directory server 104 performs a server lookup from inventory 212 and generates a prioritized list of candidate servers for peer 101 (step 704). Then, directory server 104 filters out the previously tried servers and returns the top n candidate servers from the prioritized list to peer 101 (step 706). Finally, directory server 104 updates the file range set of the content in inventory 212 for peer 101 (step 708).

Inventory Aging

Figure 8:
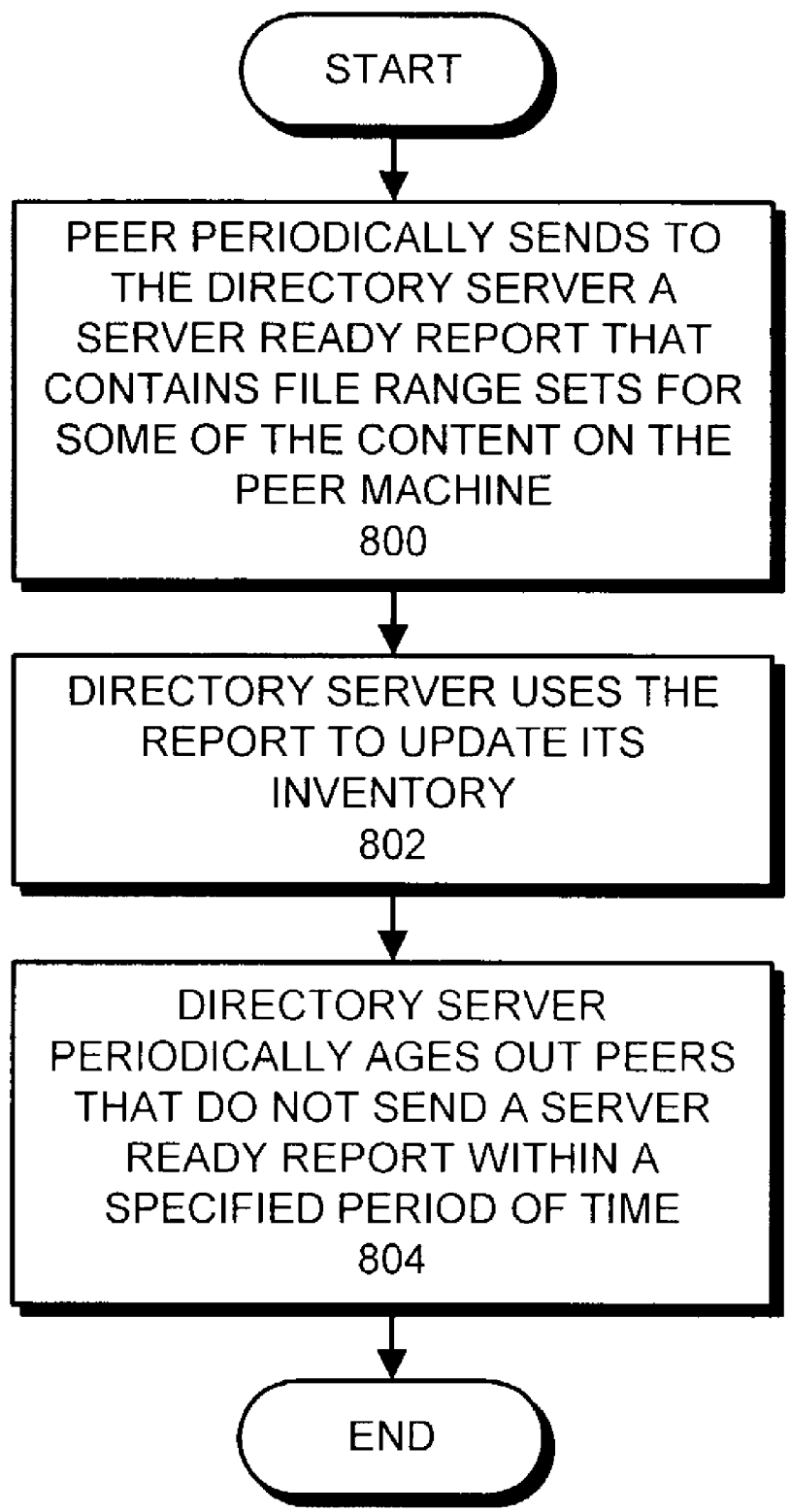
FIG. 8 illustrates the aging of inventory in accordance with an embodiment of the present invention.

FIG. 8 illustrates the process of inventory aging in accordance with an embodiment of the present invention. Peer 101 periodically sends directory server 104 a server ready report that contains file range sets for content that is available on peer 101 (step 800). Note that in one embodiment of the present invention, peer 101 sends the server ready report to logging server 110 which provides the information to directory server 104. Once directory server 104 has this new information, directory server 104 updates inventory 212 to reflect any changes specified by the new information (step 802). In another embodiment of the present invention, peer 101 sends the server ready report directly to directory server 104. Periodically, directory server 104 ages out peers that have not sent a server ready report within a pre-specified period of time (step 804).

Implementation Details

This section provides an overview of the policy governing distribution of data (media objects) in accordance with an embodiment of the present invention. Note that the implementation details described in this section are exemplary and are not meant to limit the present invention.

Peer Overview

The back end of the client (the peer) handles loading and serving, based on metadata and user requests processed by the front end. It devotes a certain number of threads to loading, and to serving (for example, 12 each). Each such loader or server can support one connection. In the absence of throttling, the peer will accept server connections up to this limit, and will establish loader connections up to this limit if there is work to be done.

The peer receives a request to load content. The object is assigned a priority. Higher priority objects are loaded in preference to lower priority objects. If there is work to be done on a higher priority object and no available loader, the lowest priority loader is preempted and reassigned to the higher priority object. In one embodiment of the present invention, there is a file priority for each type of file, and furthermore, there is a peer priority for each peer that can act as a server for the file.

Objects can be prioritized as follows:

1. Objects marked by the front end as "foreground" are associated with the users current activity. These foreground objects take precedence over those marked background, which not directly related to the users current activity (e.g., objects that are automatically pushed by subscription).

2. Otherwise, objects are prioritized first-come, first-served.

The peer transforms the load request into a set of candidate servers or targets. These are potential sources for the content, and are prioritized first by "object priority" (also referred to as "file priority"), and then by target priority (also referred to as "loader priority"). A free loader takes on the highest priority available target. (An exception to this is that a target that does not support range requests is not taken on if there is any other available or loading target for the same object.) A target is generally never taken on by multiple loaders.

The requested object is marked by the front end as either known or unknown. If it is unknown, then the request will provide a hypertext transfer protocol (http) or file transfer protocol (ftp) uniform resource locator (url). Several targets (for example four, or one if bonding is disabled) representing that url are created. If the object is known, then one target is created, representing the directory server expected to provide further targets. The targets returned by the directory server are labeled with target priorities, all greater than the target priority of the directory server itself.

Targets for a loading object are either loading, available, backed off, or marked bad. If the front end pauses and resumes loading of an object, all of its targets are made available. A target is backed off or marked bad if loading from the target ends in an error. A backed-off target becomes available again at a specified time in the future. Repeated backoffs are for greater time intervals, up to a maximum (for example, ¼, 1, 4, 16, and 64 minutes). The backoff interval is reset by successful loading. The directory server starts at a one-minute backoff, even when it returns targets (which resets its backoff interval).

Directory Server Overview

Directory server 104 receives a request for targets for a media object. The request includes the list of targets already known to the requester. Directory server 104 returns a list of targets not already known, with target priorities and the information needed to contact them.

If directory server 104 knows nothing about the object, then it will tell the requester to stall five seconds and try again. Meanwhile, it will contact the metadata server for information about the object. The metadata server contains information about all of the published content including the original source for the content. If this fails, it remembers the failure for a period of time (for example, two minutes), and tells any peers requesting targets for that object that it is not found. (This causes the peers to abort the download.) If the metadata fetch succeeds, then directory server 104 learns of one or more origin servers that it can return as targets.

If directory server 104 provides the requester with potential targets, then it adds the requester to its set of possible targets. The requester will expire out of this set after a period of time (for example, two hours, or immediately if the requester has opted out of the network). To keep the directory server target set fresh, peers report periodically (for example, hour) what objects they can serve.

Directory Server Response Policy

The list of targets (peers and origins) returned for a known object is determined as follows (in order of decreasing precedence):
1. If a target is reported as known by the requester, then it is not returned.
2. Each request from the requester for the object that results in returned targets is counted. If sufficient time has elapsed since the last satisfied request (say 30 minutes), then the count is reset. If the count is 500 or higher, then no peer targets are returned. This protects peer and directory server from excessive requests.
3. At most a pre-specified number of targets are returned.
4. Aged out peers are not returned.
5. Each return of a peer (as a target for any object) is counted. When a peer visits directory server 104, this count is reset to the peer's current number of active serving threads.
6. Targets of highest priority are returned.
7. Origins are assigned lower priority than peers.
8. Peers have a base priority of two. If they have a nonzero return count, then their base priority is one divided by return count. (This distributes load)
9. Peer priority is increased by 330 (=10(32+1)) if it has the same external IP address as the requester. Otherwise, peer priority is increased by 210 (=10(20+1)) if it shares the first 20 bits (configurable) of its external IP address with the requester. Otherwise, peer priority is increased by 10 (=10(0+1)) if it is in the same (nonzero) ASN as the requester. (prefers local sources)

Peer Loader Overview

The peer loader, which is a mechanism that receives a piece of a file, requests data from a target one range at a time. This range size needs to be big enough that the request overhead is small, but small enough that the peer can quickly adapt to changing loader availability and performance. The loader reads this range one read-range at a time. The read-range size, which facilitates throttling, is the expected size downloadable in one second, and has a 10 second timeout. Errors and other loader exit conditions are checked after each read-range, and the read is interruptible if the download is finished or canceled. Request range size is capped at the larger of 128 kB and the read-range.

Range Allocation

A target that does not support range requests is effectively asked for the first needed range. Any other target is asked for a range starting at a preferred offset, and stopping at the size cap, the EOF, or the next range already loaded or allocated to a loader. If a loader reaches a range allocated to another loader, it is preempted (the loader gives up the target, which is made available for other loaders). When there is little left to download, loaders may all load the same range (racing to finish the download).

To find the preferred offset, the loader first generates a candidate range set, then chooses a range from the set. The candidate range set can be the first of the following that is nonempty:
1. set of bytes that are unallocated, that the target has, and that all other incomplete loading targets don't have (so peer is completing a different range than its "neighbors");
2. set of bytes that are unallocated, and that the target has;
3. set of bytes that are unallocated; and
4. set of bytes that are allocated to another loader.

Then the chosen range from that range set can be either:
1. contiguous with the last range received from the target;
2. part of an open-ended range at the end of a set of unknown maximum size;
    The offset is at a distance of 32*(the range size cap) from the beginning of this range. (This is to discover how far the file extends by stepping out until EOF is found.)
3. part of the largest range in the range set;
    The offset is at the middle of this range if there are enough bytes thereafter for a full size range, or if the range bytes are allocated to another loader. (If loaders attempt to start their loads as far from each other as possible, then they will be better able to load contiguously before bumping into something already loaded by someone else.)
    Otherwise, the offset is at the beginning of this range. (So ranges are not subdivided down to inefficiently small sizes.)

Errors

I/O errors cause a backoff. An exception is when a connection to a peer target cannot be made; this causes the target to be marked bad. If a target reports an inconsistent file size, or that it doesn't have the object file or doesn't grant permission to load, then the target is marked bad. If the directory server returns such a report, then the download is aborted.

Every file has a signature that is composed of a set of block signatures. During the download, each 1 MB block is checked as it is completed. If a block check fails, then any peer targets contributing to it are marked bad. If the block was supplied entirely by origins, then the download is aborted.

A backoff error can also be caused by poor service. Poor service can be defined as no bytes for two minutes, or if after two minutes all loaders are busy, and there is an available target for the object, and this loader is getting less than a third the average bandwidth for loaders of this object or less than 250 bytes/sec.

A stall request greater than ten seconds, or one from a directory server, is handled as a backoff (the loader gives up the target) rather than a pause.

Peer Server Overview

If a peer is opted out of the network, or does not know of an object, or its copy is bad, then it will not serve the object.

Otherwise, it serves the largest contiguous range of bytes that it has that have been signature checked (if there was a block signature) and that the requester requested. Signature checking involves calculating a checksum of a block, and comparing it to an encrypted checksum from a trusted source to ensure data integrity. If there are no such bytes, then the server will tell the requester to stall for 5 seconds and then try again. The server reports what bytes it has to the requester, so the next request can be better informed. If the server is still loading the object, then it adds the requester to its list of targets. (The server learns what bytes the requester has as part of the request.)

Implementation Notes

Each peer, and the directory server, maintains an in-memory database, or inventory, of objects and targets. The inventory is a set of object entries (MOs), a set of peer and origin entries (Nodes), and a set of entries with information about the state of the object on the peer or origin (MONodes). Each entry contains information about the relevant entity. For example, Nodes contain contact information such as IP addresses and ports, and MONodes contain a range set that records which portions of an object file are available on a peer or origin. The inventory also maintains subsets of these sets sorted by various criteria to make access fast. For example, the inventory maintains subsets of MONodes sorted by object and then by target priority. The directory server lazily removes expired entries. The peer removes target entries when the download is complete or canceled, and removes object entries when the object is deleted.

Bandwidth Throttling

Figure 9:
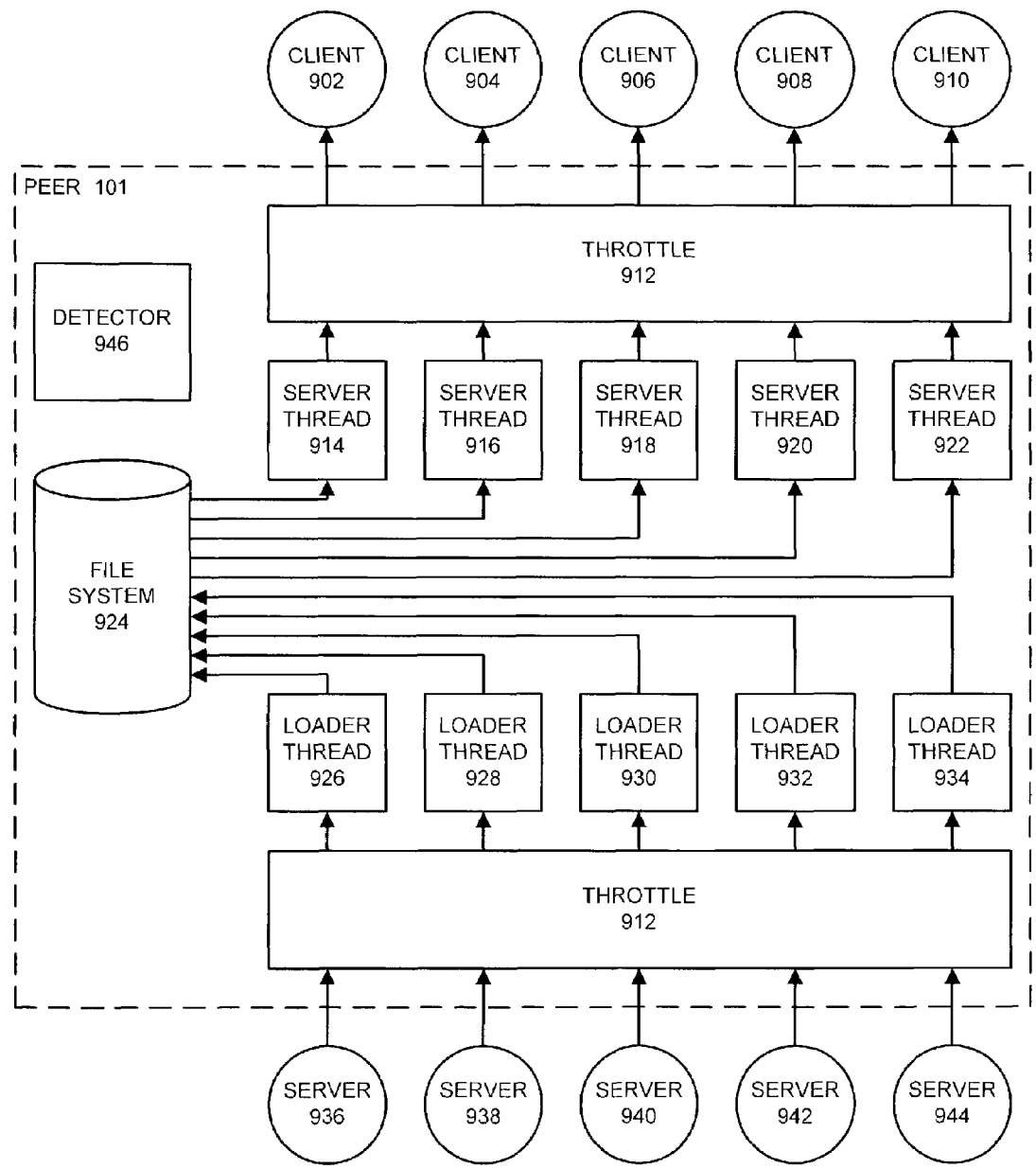
FIG. 9 illustrates a system for bandwidth throttling in accordance with an embodiment of the present invention.

FIG. 9 illustrates a system for bandwidth throttling in accordance with an embodiment of the present invention. In this system, peer 101 contains throttle 912, server threads 914–922, file system 924, loader threads 926–934, and detector 946. In one embodiment of the present invention, server threads 914–922 are threads that run server-specific code and loader threads 926–934 are threads that run loader-specific code. Peer 101 is connected to clients 902–910 and servers 936–944. Clients 902–910 can generally include any node on a network including computational capability and including a mechanism for communicating across the network. Servers 936–944 can generally include any nodes on a computer network including a mechanism for servicing requests from a client for computational and/or data storage resources.

Detector 946 detects system activity on peer 101. For example, this system activity can include bandwidth utilization, processor utilization, memory utilization, mouse and keyboard activity, URL link clicks, and file system activity. In one embodiment of the present invention, detector 946 is configured to shut off all activity of the application if it detects any activity on peer 101.

In one embodiment of the present invention, detector 946 determines whether to throttle based upon relative network use of the application. This can be determined by querying the operating system of peer 101 for the total number of incoming and outgoing bytes, and then comparing this total with the number of incoming and outgoing bytes associated with the application. Note that bandwidth for serving content to clients 902 to 910 can be throttled independently of the bandwidth for receiving data from servers 936 to 944. Also, note that the bandwidth for each connection can be throttled independently of other connections. In one embodiment of the present invention, client 902 is on the same LAN as peer 101, and peer 101 is coupled to client 904 via a 56 Kbps line. In this embodiment, the connection between peer 101 and client 902 is not throttled, but the connection between peer 101 and client 904 may be set by the throttling process to allow for a transmission rate of 20 Kbps to allow for other activity to occur on that connection.

In one embodiment of the present invention, throttle 912 acts in cooperation with remote instances of the application on remote nodes. In doing so, throttle 912 generates server hints which it sends to servers 936–944 to control incoming traffic to peer 101 by commanding servers 936–944 to adjust their transmissions to peer 101. Likewise, throttle 912 adjusts data being sent to clients 902 to 910 when it receives server hints from clients 902 to 910.

Throttle 912 can effectively throttle bandwidth a number of ways. When it is necessary to reduce bandwidth utilization, throttle 912 can reduce the packet size. Throttle 912 can also increase a wait time between sending packets, thus allowing for less packets to be sent. Conversely, when it is necessary to increase bandwidth utilization, throttle 912 can increase the packet size. Throttle 912 can also decrease the wait time between sending packets, thus allowing for more packets to be sent.

Note that packet size determines response time for the throttling process. Large packets are associated with longer response times, because it takes longer to send a single packet. On the other hand, smaller packets limit bandwidth. Hence, it is desirable to makes the packets as large as possible to maximize bandwidth while keeping them small enough to ensure adequate throttle response time.

Process of Bandwidth Throttling

Figure 10:
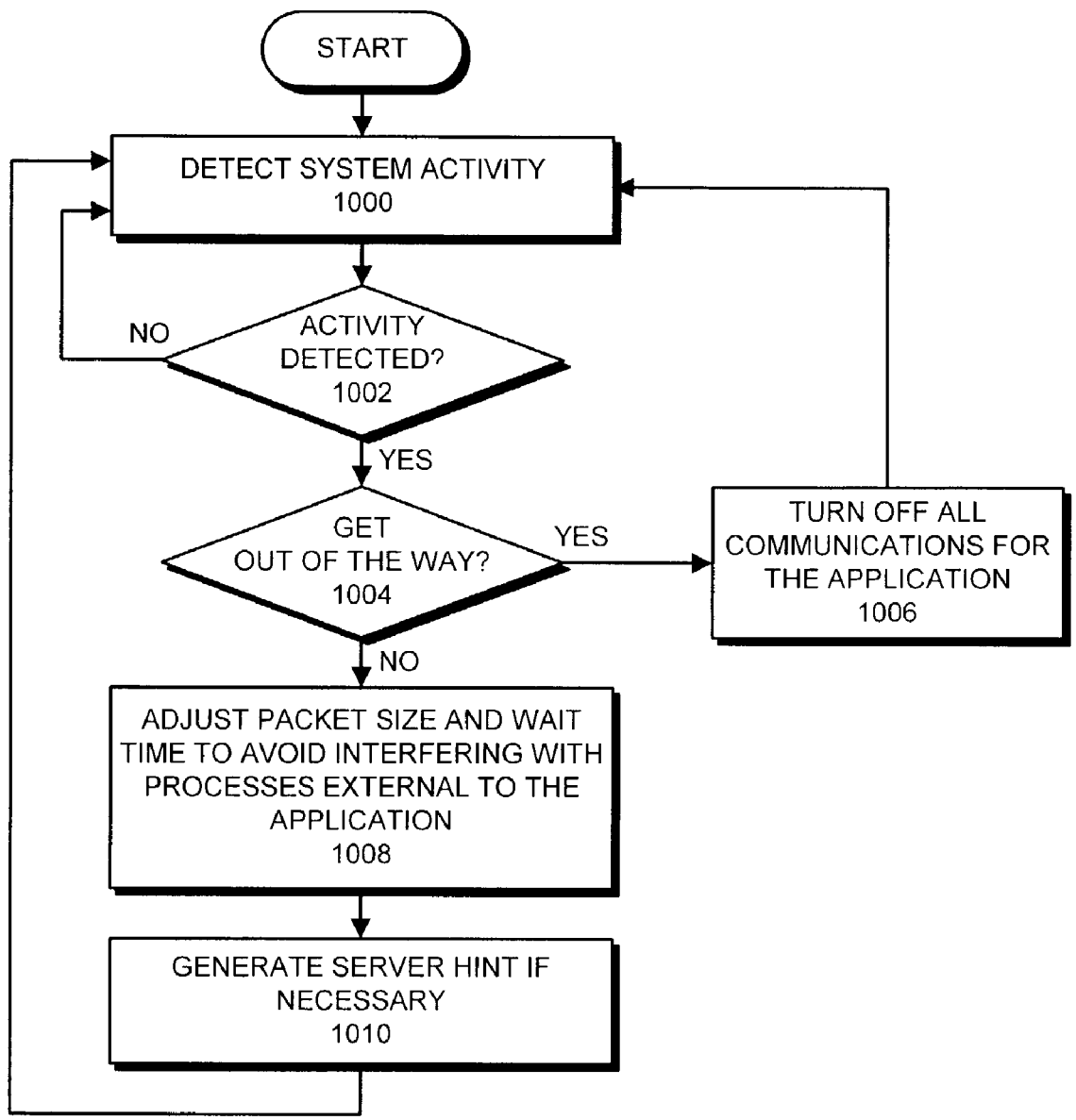
FIG. 10 presents a flowchart illustrating the process of bandwidth throttling in accordance with an embodiment of the present invention.

FIG. 10 presents a flowchart illustrating the process of bandwidth throttling in accordance with an embodiment of the present invention. The system starts by detecting system activity external to the application (step 1000). As was previously stated, this system activity can include bandwidth utilization, processor utilization, memory utilization, mouse and keyboard activity, URL link clicks, and file system activity. In one embodiment of the present invention, this activity detection process also involves checking for server hints from other peers.

If activity is not detected, the system returns to step 1000 (step 1002), otherwise the system determines if it needs to get out of the way of the user (step 1004). If so, the system turns off all communications for the application and returns to step 1000 (step 1006). Otherwise, the system throttles the bandwidth to a level where it does not adversely affect the operations of the processes external to the application. In doing so, the system attempts to throttle "background processes" that are not related to the user's current activities, instead of throttling "foreground processes" that are related to the user's current activity.

Bandwidth throttling can be accomplished by adjusting the size of the packets of data that are sent, and by adjusting the wait time between sending packets (step 1008). An increase in packet size and a decrease in wait time will result in higher bandwidth utilization, while a decrease in packet size and an increase in wait time will result in lower bandwidth utilization. If the system needs to limit incoming bandwidth, the system generates a server hint to send to the server that is delivering content to the application (step 1010). Sending the server hint to the server causes the server to adjust the bandwidth accordingly. Once the parameters are adjusted, the system returns to step 1000 and starts the process over again.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for dynamically configuring communication parameters for an application on a network node, comprising:
   monitoring activities external to the application on the network node; and
   if a level of the activities exceeds a specified threshold, throttling communications generated by the application by adjusting communications parameters for the application, so that activities external to the application are not adversely affected by communication activities of the application, wherein adjusting the communication parameters for the application can involve
      temporarily ceasing all communications activity for the application; and
      reassigning a loader/server thread for the application which handles communications to another connection; and
   receiving a server hint from a remote application located on a remote node that receives outbound communications from the application; and
   adjusting the outbound communications parameters for the application in response to server hints, thereby allowing the remote application to adjust inbound communications from the application.

2. The method of claim 1, wherein adjusting the communications parameters for the application involves adjusting the communications parameters for each connection between the application and remote applications on remote network nodes independently.

3. The method of claim 1, wherein adjusting the communications parameters for the application further comprises:
   generating server hints; and
   sending the server hints to remote applications on remote network nodes,
wherein the server hints inform the remote applications to adjust the communications parameters for communications sent to the application.

4. The method of claim 1, wherein adjusting the communications parameters for the application involves adjusting a time the application waits between sending packets.

5. The method of claim 1, wherein adjusting the communications parameters for the application involves adjusting packet size.

6. The method of claim 1, wherein adjusting the communications parameters for the application involves adjusting the communications parameters for outbound communications independently from adjusting the communications parameters for inbound communications.

7. A computer-readable storage medium storing instructions that when executed by a computer cause the computer to perform a method for dynamically configuring communication parameters for an application on a network node, comprising:
   monitoring activities external to the application on the network node; and
   if a level of the activities exceeds a specified threshold, throttling communications generated by the application by adjusting communications parameters for the application, so that activities external to the application are not adversely affected by communication activities of the application, wherein adjusting the communications parameters for the application can involve
      temporarily ceasing all communications activity for the application; and
      reassigning loader/server thread for the application which handles communications to another connection;
   receiving a server hint from a remote application located on a remote node that receives outbound communications from the application; and
   adjusting the outbound communications parameters for the application in response to server hints, thereby allowing the remote application to adjust inbound communications from the application.

8. The computer-readable storage medium of claim 7, wherein adjusting the communications parameters for the application involves adjusting the communications parameters for each connection between the application and remote applications on remote network nodes independently.

9. The computer-readable storage medium of claim 7, wherein adjusting the communications parameters for the application further comprises:
   generating server hints; and
   sending the server hints to remote applications on remote network nodes,
wherein the server hints inform the remote applications to adjust the communications parameters for communications sent to the application.

10. The computer-readable storage medium of claim 7, wherein adjusting the communications parameters for the application involves adjusting a time the application waits between sending packets.

11. The computer-readable storage medium of claim 7, wherein adjusting the communications parameters for the application involves adjusting packet size.

12. The computer-readable storage medium of claim 7, wherein adjusting the communications parameters for the application involves adjusting the communications parameters for outbound communications independently from adjusting the communications parameters for inbound communications.

13. An apparatus for dynamically configuring communication parameters for an application on a network node, comprising:
   a monitoring mechanism configured to monitor activities external to the application on the network node; and
   an adjustment mechanism configured to adjust communications generated by the application by adjusting communications parameters for the application if a level of the activities exceeds a specified threshold, so that activities external to the application are not adversely affected by communication activities of the application, wherein the adjustment mechanism is further configured to cease all communications activity for the application; and
   a reassigning mechanism configured to reassign a loader/server thread for the application which handles communication to another connection; and
   a receiving mechanism configured to receive a server hint from a remote application located on a remote node that receives outbound communications from the application; and a tuning mechanism configured to adjust the outbound communications parameters for the application in response to server hints, thereby allowing the remote application to adjust inbound communications from the application.

14. The apparatus of claim 13, wherein the adjustment mechanism is further configured to adjust the communications parameters for each connection between the application and remote applications on remote network nodes independently.

15. The apparatus of claim 13, further comprising:
a generation mechanism configured to generate server hints; and
a delivery mechanism configured to send the server hints to remote applications on remote network nodes, wherein the server hints inform the remote applications to adjust the communications parameters for communications sent to the application.

16. The apparatus of claim 13, wherein the adjustment mechanism is further configured to adjust a time the application waits between sending packets.

17. The apparatus of claim 13, wherein the adjustment mechanism is further configured to adjust packet size.

18. The apparatus of claim 13, wherein the adjustment mechanism is further configured to adjust the communications parameters for outbound communications independently from adjusting the communications parameters for inbound communications.

19. A means for dynamically configuring communication parameters for an application on a network node, comprising:
a monitoring means for monitoring activities external to the application on the network node; and
an adjustment means for throttling communications generated by the application by adjusting communications parameters for the application if a level of the activities exceeds a specified threshold, so that activities external to the application are not adversely affected by communication activities of the application, wherein adjusting the communications parameters for the application can involve
temporarily ceasing all communications activity for the application; and
reassigning a loader/server thread for the application which handles communications to another connection;
a receiving means for receiving a server hint from a remote application located on a remote node that receives outbound communications from the application; and
an adjusting means for adjusting the outbound communications parameters for the application in response to server hints, thereby allowing the remote application to adjust inbound communications from the application.

20. An operating system containing instructions that when executed by a computer cause the computer to perform a method for dynamically configuring communication parameters for an application on a network node, comprising:
monitoring activities external to the application on the network node; and
if a level of the activities exceeds a specified threshold, throttling communication generated by the application by adjusting communications parameters for the application, so that activities external to the application are not adversely affected by communication activities of the application, wherein adjusting the communications parameters for the application can involve
temporarily ceasing all communications activity for the applications; and
reassigning a loader/server thread for the application which handles communications to another connection; and
receiving a server hint from a remote application located on a remote node that receives outbound communications from the application; and
adjusting the outbound communications parameters for the application in response to server hints, thereby allowing the remote application to adjust inbound communications from the application.

* * * * *